(12) United States Patent
Fraivillig

(10) Patent No.: US 10,253,228 B2
(45) Date of Patent: *Apr. 9, 2019

(54) SURFACE MOUNTING USING PARTIALLY CURED B STAGED AND FULLY CURED C STAGED THERMOPLASTIC POLYIMIDE TPI ADHESIVE COMPOUNDS

(71) Applicant: James B. Fraivillig, Boston, MA (US)

(72) Inventor: James B. Fraivillig, Boston, MA (US)

(73) Assignee: FRAIVILLIG TECHNOLOGIES COMPANY, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/487,662

(22) Filed: Apr. 14, 2017

(65) Prior Publication Data

US 2017/0321096 A1    Nov. 9, 2017

Related U.S. Application Data

(63) Continuation of application No. 13/972,509, filed on Aug. 21, 2013, now Pat. No. 9,624,412.

(51) Int. Cl.
| | | |
|---|---|---|
| *C08G 69/26* | (2006.01) | |
| *C09J 179/08* | (2006.01) | |
| *B05D 1/26* | (2006.01) | |
| *B05D 1/28* | (2006.01) | |
| *B32B 27/28* | (2006.01) | |
| *B05D 3/10* | (2006.01) | |
| *B05D 3/14* | (2006.01) | |
| *B32B 37/12* | (2006.01) | |
| *C09J 5/06* | (2006.01) | |
| *C09J 7/35* | (2018.01) | |

(52) U.S. Cl.
CPC .............. *C09J 179/08* (2013.01); *B05D 1/26* (2013.01); *B05D 1/28* (2013.01); *B05D 1/283* (2013.01); *B05D 3/108* (2013.01); *B05D 3/144* (2013.01); *B32B 27/281* (2013.01); *B32B 37/1207* (2013.01); *C09J 5/06* (2013.01); *C09J 7/35* (2018.01); *C09J 2201/61* (2013.01); *C09J 2203/326* (2013.01); *C09J 2477/00* (2013.01); *C09J 2479/08* (2013.01)

(58) Field of Classification Search
None
See application file for complete search history.

(56) References Cited

U.S. PATENT DOCUMENTS

2015/0057396 A1* 2/2015 Fraivillig ............... B05D 3/108
524/104

FOREIGN PATENT DOCUMENTS

EP        0048315     *  4/1985

* cited by examiner

*Primary Examiner* — Robert T Butcher
(74) *Attorney, Agent, or Firm* — John M. Brandt

(57) ABSTRACT

A process utilizing thermoplastic adhesives for surface mounting or laminating two or more substrate surfaces consisting of a combination of thermoplastic-polyimide (TPI) adhesive layers, one of which is B-staged or partially cured, and the other of which is C-Staged or fully cured, employed both as direct coatings and/or stand alone bond-films, as well as their advantageous use in joining materials of mismatched Coefficients of Thermal Expansion (CTE).

10 Claims, 2 Drawing Sheets

Conventional Si die-mounting

| Common electronic-packaging materials | | Coefficient-of-Thermal-Expansion (CTE, ppm/°C |
|---|---|---|
| Semiconductors | Silicon (Si) | 2.6 |
| | Silicon carbide (SiC) | 4.2 |
| | Gallium nitride (GAN) | 5.6 |
| | Gallium arsenide (GaAs) | 6.5 |
| | Sapphire (α-Al₂O₃) | 7 |
| Ceramics | Aluminum nitride (AlN) | 4.5 |
| | Boron nitride (BN) | 5.6 |
| | Alumina (Al₂O₃) | 6.9 |
| Metals | Copper (Cu) | 17 |
| | Aluminum (Al) | 23 |

SURFACE MOUNTING USING PARTIALLY CURED B STAGED AND FULLY CURED C STAGED THERMOPLASTIC POLYIMIDE TPI ADHESIVE COMPOUNDS

CROSS REFERENCE TO RELATED APPLICATIONS

This application is a continuation-in-part of U.S. application Ser. No. 13/972,509 filed Aug. 21, 2013 by the same inventor and is hereby incorporated by reference.

BACKGROUND OF THE INVENTION

Field of the Invention

This invention relates to thermoplastic adhesives for surface-mounting employing a combination of thermoplastic-polyimide (TPI) partially cured B-staged and fully cured C-Staged adhesives and in particular their advantageous use in joining materials of mismatched Coefficients of Thermal Expansion (CTE).

Description of the Prior Art

As an example, the lamination of semiconductor die to an aluminum heat sink is common in high-power applications, as the heat sink dissipates the heat generated from the semiconductor. As the laminated materials have severely mismatched CTEs, such as aluminum, approximately 23 ppm/° C. and semiconductor, approximately 2-8 ppm/° C., the bond line between the die and the heat sink undergoes significant inter-laminar stress during the wide temperature excursions of processing and use. Failure of the bond line between the semiconductor and the heat sink will dramatically reduce thermal dissipation between the surfaces, resulting in overheating and failure of the semiconductor.

There are a number of existing technologies employed for die-attach (chip-bonding or mounting) lamination of a semiconductor to an aluminum heat sink for thermal management.

Conventional die-attachment is generally done with epoxy that has been filled with metal powder to enhance thermal conductivity. Often, electrical conductivity of the die-attach bond line is also critical.

Thermoset epoxy polymers are brittle, both unfilled and especially filled, and so the die-attach epoxy bond line is designed to withstand the inter-laminar stress without inducing cracks in the epoxy which will propagate with time and temperature cycling. Reducing the thickness of the bond line exponentially increases the inter-laminar stress between the die and heat sink, and so epoxy bond lines have a minimum thickness of 1-1.5 mil (25-37 um) and are often considerably thicker.

To maximize thermal transfer and potentially electrical transfer between the die and heat sink, highly conductive metal powders such as silver are compounded into liquid, uncured, A-staged epoxy resin. The concentration of these metal powders can reach 80% by weight or more as solids in the cured bondline. As silver is a precious metal, and is often used in a costly micro- or even nano-sized format, the cost component of the metal in the bondline is significant, especially as the epoxy bondline needs to be 1 mil (25 um) thick or more.

When thermal conductivity, but not electrical conductivity, of the die-attach bondline is desired, ceramic powders are used as fillers in epoxy bondlines. Ceramic powders, such as alumina and boron nitride, are high thermal-conductivity dielectrics.

In processing, the die-attach epoxy is applied to the heat sink surface manually or with an automated dispenser. After the semiconductor die is precisely placed onto the epoxy surface, the subassembly's bondline is then cured with heat in a controlled manner that allows outgassing and avoids voiding. Some pressure may also be applied.

The invention disclosed herein, i.e., the use of a combined C-staged and B-staged TPI adhesive bondline has the following advantages in die-attach over the epoxy technology described above:

The TPI polymer will not crack, allowing much thinner bondlines between CTE mismatched surfaces and potentially enabling higher loadings of metal particles which, if used in an epoxy adhesive, would further embrittle the already brittle cured epoxy.

Thinner die-attach bondlines will enable higher thermal and electrical transfer rates between the die and the heat sink.

Thinner die-attach bondlines will utilize much less material, providing substantial cost savings.

While epoxy die-attach bondlines have a maximum temperature rating of 175° C. or less, TPI bondlines can operate continuously at well above 250° C. This will become increasingly important with the transition to wide band-gap semiconductors, such as SiC and GaN, which can operate very efficiently at high temperature.

Die-attachment can also be done with eutectic solders, in pre-forms or as paste, compounded with an organic flux that prevents oxidation of the surfaces at high temperature and promotes surface wet-out, ensuring an optimal bondline. Solder die-attach is highly electrically and thermally conductive and can provide a robust ductile bondline that provides a buffer between CTE mismatched surfaces.

High-performance solders are generally made with precious metals such as silver (Ag) and gold (Au) and, for die-attachment, require extreme reflow temperatures, such as 363° C. for gold-silicon alloy (AuSi). Precious-metal solders generally have bondline thicknesses in the 1-10 mil (25-250 um) range. As aluminum heat sinks do not provide a readily solderable surface, the targeted aluminum area requires a metal plating or braising of a precious metal to ensure a robust solder joint between the semiconductor die and the heat sink. This primer metallization is generally between 0.08 and 0.15 mil (2-4 um). Both the raw materials and required processes for eutectic solder die-attachment are very costly.

The invention disclosed herein, i.e., the use of a combined C-staged and B-staged TPI adhesive bondline has the following advantages in die-attach over precious-metal solder technology described above:

The material cost of TPI polymer is lower than precious-metal solder.

The equipment requirements and process cost of the TPI bondline is lower than the process cost of precious-metal solder, as much lower temperatures are utilized in curing TPI than in reflowing precious-metal solder.

TPI generally does not require a prime coat to bond to aluminum. Precious metal plating or braising of the aluminum surface to be bonded is expensive in both material and process cost. In the invention, when priming of a metal, ceramic or semiconductor surface is required to ensure a robust bondline, a simple wipe with A-staged TPI liquid and then a quick bake to drive off the solvent and B-stage the polymer suffices.

There is therefore potentially much higher thermal and electrical conductivity in a much thinner TPI bondline filled with metal particles.

SUMMARY OF THE INVENTION

The invention may be summarized as a method employing a two-layer TPI adhesive for the attachment of two surfaces, for example, of a semiconductor directly to an aluminum heat sink, which minimizes components, materials and processing. The TPI layers consist of a first fully cured or C-staged prime layer and a second partially cured B-staged layer. The ultra-thin nature of TPI bondlines maximizes thermal and electrical conductivity between the two surfaces. In addition, the TPI polymer can be processed with simple equipment in coating, drying and curing, and laminating.

It is important to understand the three phases of the TPI adhesive described as follows.

A-stage is a liquid solution of polyamic-acid polymer, the precursor to TPI. A-staged TPI adhesive is a one-part system. As opposed to the two-part high-performance epoxy adhesives, A-staged TPI adhesive is very stable. At room temperature, its pot-life is measured in days or weeks; when kept in a freezer, its shelf life is indefinite. The liquid A-staged TPI adhesive can be compounded with fillers to tailor the properties of the bondline. The viscosity of A-staged TPI adhesive is highly dependent on temperature; this characteristic could be helpful in the dispensing of the material onto surfaces.

B-stage is a partially dried-and-cured coating of PAA/PI polymer on a substrate or carrier. B-staged TPI adhesive coatings are stable at room temperature and have an indefinite shelf life. This facilitates the manufacturing and storage of TPI assemblies. B-staged TPI adhesive coatings and bondlines may have residual solvent (10-50%), but will act as a solid at room temperature. The effective glass-transition temperature (Tg) of B-staged TPI coatings and bondlines is the highest temperature that that polymer has experienced in previous processing. Above this temperature, the B-staged TPI will soften and become tacky again, which may assist assembly. As further solvent is lost and additional PAA polymer converted to TPI, the effective Tg of the B-staged TPI coatings and bondlines increases.

C-stage is a fully cured layer of TPI polymer. Not only does fully curing maximize the dielectrical, physical, thermal and mechanical strength of the polymer, but fully curing or C-staging the initial coated layer on the semiconductor maximizes that surface's interface strength in the bond joint.

A suitable solvent for a polyamic acid polymer of the invention is N-methyl-2-pyrrolidone (NMP) or dimethylacetamide (DMAC) in which may be disposed, for example, any of the following monomers:

3,5-diaminobenzoic acid (DABA), 3,3'-diaminobenzophenone (3,3'-DABP), 3,4'-diaminobenzophenone (3,4'-DABP), 1,3-Bis (4-aminophenoxy) benzene (TPER), 3,4'-Oxydianiline (3,4'-ODA), 4,4'-Oxydianiline (4,4'-ODA), 4,4'-Methylene dianiline (4,4'-MDA), an aliphatic diamine, and a silicon-diamine; and said dianhydride monomer is selected from the group consisting of 3,3',4,4'-Biphenyltetracarboxylic dianhydride (BPDA), 3,3',4,4'-Benzophenone tetracarboxylic dianhydride (BTDA), 4,4'-Oxydiphthalic anhydride (ODPA), Pyromellitic dianhydride (PMDA), and 2,2'-Bis-(3,4-Dicarboxyphenyl) hexafluoropropane dianhydride (6FDA).

As noted above, fully curing or C-staging the initial TPI layer on one of the surfaces ensures maximum anchorage to that surface. A second partially cured or B-staged TPI layer is then applied to the C-staged TPI layer to ensure anchorage of both surfaces after a lamination process.

The combination of C and B stage TPI-coated die are placed on the aluminum surface by hand or with automation. If the aluminum is heated above the effective Tg of the B-staged coating, then the chip can adhere naturally to the aluminum for precise placement, without additional glue or hardware.

Pressure can be applied with hardware or a platen. Less pressure locks in less inherent stress between the lamination layers. Assembly clips and other hardware can apply pressures of 1-50 psi during TPI lamination. This moderate pressure allows the solvent and evolved water vapor, which has a very high vapor-pressure at high-temperature TPI lamination, to evacuate the bondline.

The maximum TPI lamination curing-process temperature is application-dependent. If the dielectric properties of the TPI do not require high dielectric strength or resistivity, residual PAA is low in both, but has good structural properties, then a maximum temperature of 150-200° C. will often suffice. If the dielectric properties are critical, then a higher maximum temperature of 230-300° C. is recommended. Maximum lamination temperature should be 10-20° C. above the highest expected downstream process or application temperature. If the expected downstream process or application temperature is extremely high (300-450° C.), then it is critical that full curing of the TPI bondline is ensured, through both process temperature and cure time. If the TPI is not fully cured, then encountering higher temperature will result in additional water outgassing from subsequent PAA=>TPI curing at very high vapor pressure, which could result in blistering and delamination.

Dwell time will be application-dependent. Compared to thermosets, the thermoplastic TPI polymer reacts very fast at high temperature so the dwell time can be minimized.

Full curing of a TPI bondline can be determined with the polymer's electrical-resistivity (ion-viscosity) measurement.

TPI bondlines will provide very robust, ultra-thin bondlines after curing between dissimilar surfaces with significant CTE mismatches. TPI bondlines will also withstand harsh thermal shocks, up to a ΔT of 400° C., and extreme temperature exposures, from cryogenic to greater than 400° C. for a short period, and greater than 250° C. continuously, without structural or dielectric degradation. In addition, the TPI polyimide structure also provides excellent chemical resistance.

TPI bondlines are rugged even when ultra-thin, down to a few microns. Their relative thinness allows the optimization of thermal as well as electrical conductivity across the bondline, and minimizes material cost, an extremely important consideration for coatings using precious-metal compounds. In contrast to thermosets, which are quite brittle, the ductility of TPI bondlines even when ultra-thin, enables them to withstand stresses, such as those from CTE mismatched laminations, without degradation.

Two alternative procedures for carrying out the combined C-staged and B-staged TPI laminating process are presented as examples of the preferred embodiment of the invention. The first uses a liquid A-stage TPI applied to one of the surfaces which is then fully cured to C-stage by an appropriate amount of heat, and thereafter followed by a second application of liquid precursor either over the C-staged surface or the second surface to be bonded with the first.

The second procedure uses a separately prepared bondfoil coated with one or more of the fully cured and/or partially cured TPI layers as is more fully disclosed in the co-pending application identified above.

A particularly advantageous result of the processes described herein employing either of these approaches is that the resulting laminates are relatively flat and do not exhibit the significant bowing, distortion, or curling that often occurs when laminating sheets of planar materials with mismatched coefficients of thermal expansion. The optimal process methods for ensuring that this lamination-flatness characteristic is displayed are processes are isostatic, such as lamination in a fixture in a vacuum oven, rather than in a convention platen press, which would impart inherent stresses in the lamination during bonding. In not exhibiting significant bowing at the laminate's equilibrated state, it can be assumed that the low CTE layer's compression, such as within silicon, is balanced by the high-CTE layer's expansion, such as within aluminum.

The use of fillers, especially metal powder or flake, can significantly impact the relative curing rates of the TPI polymer during lamination. The TPI polymer's curing rate (B-stage to C-stage) is highly dependent on temperature. High thermal-conductivity fillers dramatically increase the rate of adhesive-layer heat-up in the lamination process. This can dramatically reduce lamination process time, which is advantageous. It has been seen that a silver-flake loading of 80%-by-weight in a TPI bondline between a silicon die and an aluminum baseplate can have complete lamination to full cure of the polymer in only a few seconds (assumes that the aluminum baseplate is already at the lamination temperature when the silicon die is placed with pressure).

TPI bondlines as created by the method of the invention will be useful in many applications ranging from electronic packaging and superconducting magnets, to jewelry and art. For example, TPI can robustly bond ceramic and glass-like materials to metal surfaces.

The features and advantages of the invention will be more fully understood from the description of the preferred embodiments in conjunction with the drawings which follows.

DESCRIPTION OF THE PREFERRED EMBODIMENTS

Figure 1:
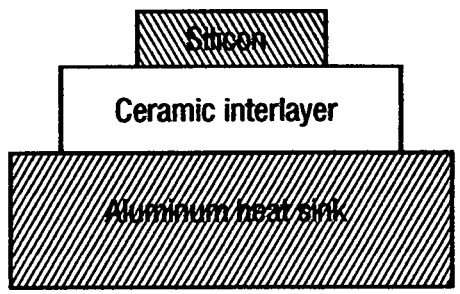
FIG. 1 is a table of materials appropriate for use in the invention.

The details of the description below are presented where appropriate with reference to a bonding procedure carried out between, for example, a semiconductor and an aluminum heat sink as those shown in the table of FIG. 1 and are exemplary only as the invention is applicable to other surface materials as is stated above, such as all semiconductor, ceramic, metal, and plastic materials.

TPI coatings are made by polymerizing polyamic-acid (PAA) polymer in polar aprotic solvents, such as N-methyl-2-pyrrolidone (NMP) and dimethylacetamide (DMAC). This liquid form is defined as A-staged. The PAA's solids concentration can be 5-40% by weight in solution, and commonly is 15-25%. TPI PAA solution is a one-part adhesive, and is very stable when kept in a freezer or may be left out at ambient temperatures for a few days.

TPI coatings can be compounded with powder fillers such as ceramic, metal and pigments to tailor the properties of the bondline. On a solids basis, fillers can be compounded from 5-98% by weight into the TPI polymer.

The TPI coating can be applied to surfaces to be bonded with a range of conventional technologies, even a simple wipe. The viscosity of the TPI-PAA solution is very sensitive to temperature, yet stable. This feature can be utilized in carrying out specific applications of the TPI coating.

Pre-treatment of the surfaces to be coated, such as corona-, plasma- or flame-treatment, may improve the wetting of the TPI coating and eventual adhesion of the cured TPI bondline, but is often not required.

Since liquid TPI coatings are relatively low-solids, typically 15-25%, the initial thickness of a coating in processing will be much greater than the finished cured bondline. Using a TPI coating solids of 20%, the final TPI coating would be less than one seventh the initial wet thickness. The final cured thickness of a TPI coating can be 0.5-20 um. Assuming a solids level of 20%, the initial A-staged coating would be approximately 3-120 um before drying.

The C-staged and B-staged layers can be extremely thin. The initial C-staged primer layer on the silicon when dry can be 0.1-2 um. The subsequent B-staged layer will need to be relatively thicker to provide conformance to the aluminum surface; 1-12 um when dry should generally suffice. An even thicker B-staged layer may be required in applications with very rough surfaces or where a dielectric strength of the finished TPI insulation layer is required.

Figure 2:
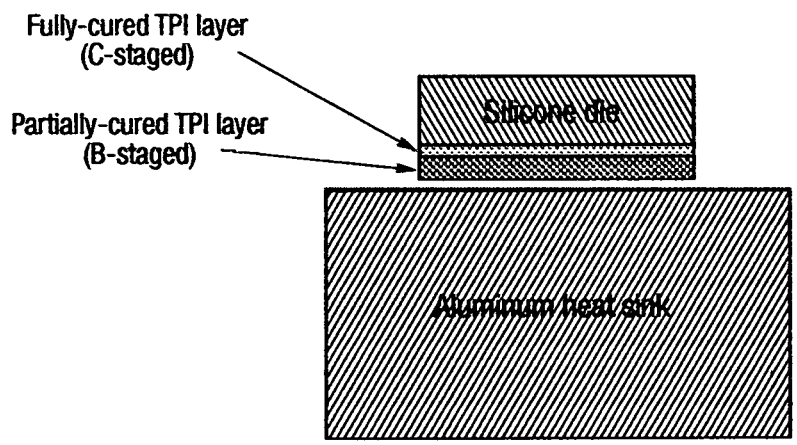
FIG. 2 is a schematic representation of one preferred embodiment of the invention.

As shown in FIG. 2, liquid A-staged TPI is applied to the semiconductor, after which heat is applied to drive off the solvent and dry and cure the TPI coating. This process can be done with conventional ovens, vacuum ovens, hot plates and radiant heaters. To ensure the full curing or C-staging of the initial TPI coating on the semiconductor surface, a high temperature bake is required, generally at least at 230° C.

A second liquid A-staged layer of TPI is then applied to the C-staged layer and then partially cured to a B-stage by baking at much more moderate temperatures, generally at between 70 and 120° C., ensuring the polymer reactivity required to adhere to the aluminum surface during lamination. Alternatively, the second liquid A-staged layer of TPI may be directly applied to the aluminum heat sink.

To construct the C-staged and B-staged TPI coatings on the semiconductor surface, liquid TPI precursor, A-staged polyamic-acid polymer in solvent is applied with conventional methods, such as spin-coating, extrusion or spraying. These are the same commonplace processes already utilized to apply polyimide coatings to the topside of semiconductors for a dielectric layer, and are standard procedures in the electronics industry.

Both C-staged and B-staged TPI coatings can be done on an entire semiconductor wafer before dicing or on individual die. The combined two layer TPI coated semiconductor die are placed on the aluminum surface and then laminated with relatively moderate temperature and pressure, for example, 240° C. or more and 5-200 psi. The moderate pressure allows evolved solvent and water from the polymer's condensation reaction to escape along the bondline. If the pressure is too great, and the water vapor is entrapped, blistering occurs, which will destroy the bondline.

Maximum process temperature for semiconductor-aluminum laminations is application-dependent. For moderate temperature applications, the process temperature should be 10-20° C. above the expected maximum downstream temperature in manufacturing or use. For high-temperature applications, such as 250° C. and above, the maximum process temperature of the bondline should ensure that the TPI polymer is fully cured, as no additional water would be evolved. TPI bondline assembly can also be assisted with vacuum-lamination, which helps the removal of evaporating solvent and water evolved from the PAA's condensation reaction to TPI.

As long as there is enough pressure to ensure contact between the lamination surfaces, then tooling and the applied pressure can be minimized during the lamination process. This ensures that minimal internal stresses are inherent in the laminate when it cools from the process temperature. When the laminated assembly heats back up towards its maximum process temperature during downstream processing and operation, the internal stresses will be reduced. In the automated assembly of electronic packages, A-staged TPI liquid, which is tacky, can also assist in die placement when disposed on the surface of the aluminum.

Figure 3:
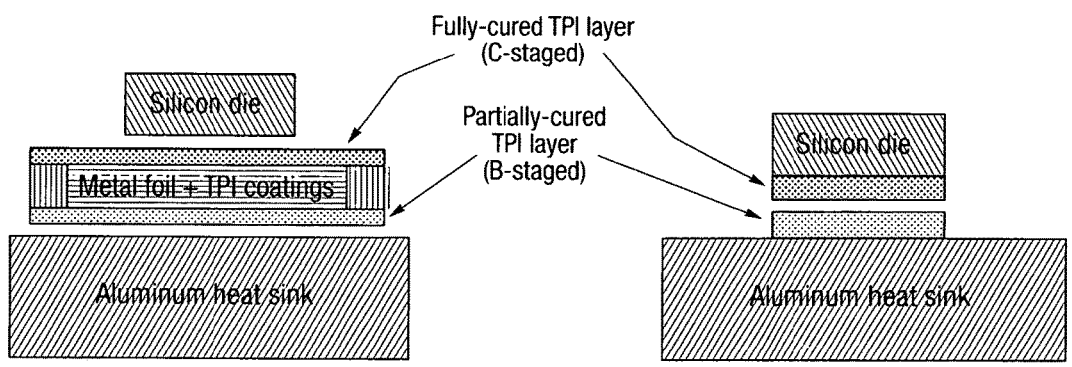
FIG. 3 is a schematic representation of an additional preferred embodiment of the invention.

Referring next to FIG. 3, an additional preferred embodiment is illustrated in which a pre-prepared bondfoil having a C-staged TPI layer disposed on one side and a second B-staged on the other. A metal bondfoil substrate for this application will maximize thermal conductivity. A silicon die with its backside either metallized or TPI-primed is placed on an aluminum heat sink with a TPI bondfoil interposed. The topside of the silicon die and corresponding TPI bondfoil can be pre-adhered onto a high-temperature pressure-sensitive carrier tape, for example, Kapton® tape with silicone adhesive, that both ensures the die's position on the aluminum as well as protects the die's topside during processing. The tape can be removed after lamination or can serve as a selective permanent dielectric layer on the aluminum heat sink.

Figure 4:
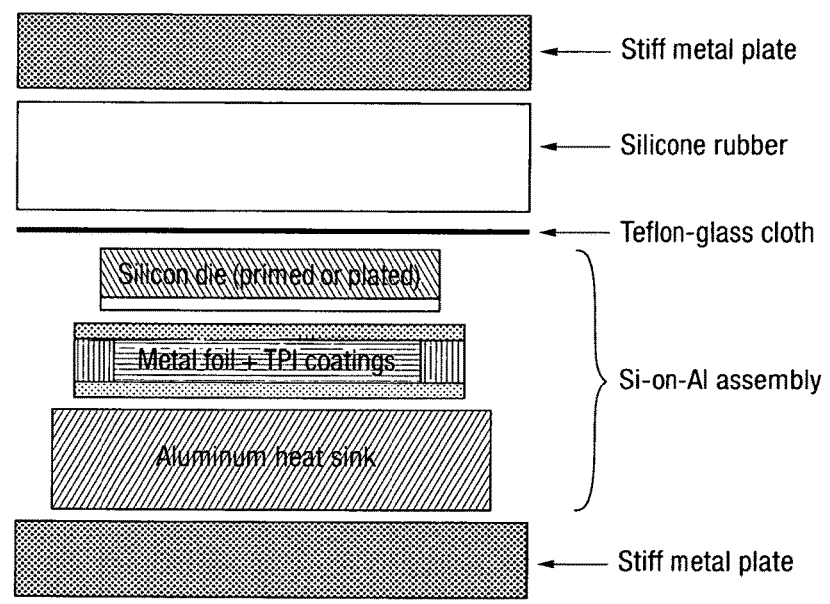
FIG. 4 is a schematic drawing of the process of the embodiment of FIG. 3.

As shown in FIG. 4, the Si-on-Al assembly is then placed in a stack-up for the lamination between two stiff metal plates, with both a thick high-temperature silicon rubber pad (temperature-resistance may be enhanced by loading the silicone polymer with iron) and a Teflon-glass cloth (TGC) release layer (2-5 mil) on the silicon top side. If the aluminum heat sink is robust enough to spread applied pressure by itself, generally ⅛" thick or more, the bottom stiff metal plate may not be required. This assembly stack-up is then subjected to consistent low to moderate pressure of about 8 to 10 psi by a clamping assembly. Even binder clips or their equivalent may be used throughout the lamination-process bake cycle. In this construction, the applied pressure on the silicon die, which rise above the overall surface, can be an order of magnitude greater than the average pressure applied by the mechanical clamping. This increased pressure assists with the silicon die-mounting without interfering with the naturally outgassed water from the condensation reaction of TPI curing at high temperature. For instance, the vapor pressure of water is around 500 psi at 250° C., much greater than the pressure that the silicon die experiences from clamping, 50 psi for example.

As the TPI adhesive layers are very thin, generally 2-5 um, a pressure high-spot in one area results in a pressure low-spot in an adjacent area, and the lower-pressure region could have considerably lower or no adhesion of the TPI to the heat sink. Therefore, the clamping assembly should be configured to apply even pressure across the lamination surface, preferably towards the center of the plate, rather than just on the edges, as that would produce a cantilever effect that could lead to inconsistent pressure across the face.

The clamped assembly is then placed in a constant-temperature oven at 220-300° C. or more, the maximum cure temperature depending on the application and the expected downstream exposure, a baked until the assembly reaches the maximum temperature plus an additional dwell time of at least several minutes to ensure complete TPI curing. This is generally in the range of 15 to 30 minutes. A vacuum-assist may also be employed to help with outgassing required by the $H_2O$ condensation reaction of PAA to TPI which occurs at elevated temperatures. The evolved water vapor has a very high vapor pressure at elevated temperatures and easily escapes the low to moderate pressure of the clamped bondline.

A custom clipping structure could be flat on the bottom side, allowing the curing process described above to be done on a conventional hot plate, which would reduce the process time. In addition, the hot plate process facilitates continuous-processing as opposed to oven-baked batches.

The clamped assembly is then removed from the oven, and allowed to cool. The use of water to cool the hot assembly reduces the cool-down time dramatically, although care must be taken to ensure that the cooling-process water does not contact the TPI bondline.

When cool, the clamped stack-up can be disassembled, and the lamination process is complete. Cured TPI assemblies can be 'heat-conditioned' at temperatures in excess of their maximum curing temperature: generally about 30-50° C. above the oven temperature. This post-process can be helpful in stress-relief, enhancing the bond's robustness, and can result in early detection of less than optimally bonded silicon die that can easily be reworked.

What is claimed is:

1. A method for preparing a laminate by bonding two surfaces utilizing heat activated thermoplastic adhesive, said method comprising in combination:
   A. providing a first laminate surface to be bonded;
   B. providing a first liquid solution comprising a less than fully cured thermoplastic polyimide adhesive precursor polyamic acid polymer disposed in a solvent;
   C. coating a layer of said first liquid solution upon said first surface;
   D. fully curing said first liquid solution to form a layer of fully cured thermoplastic polyimide adhesive;
   E. providing a second laminate surface to be bonded;
   F. providing a second liquid solution comprising a less than fully cured thermoplastic polyimide adhesive precursor polyamic acid polymer disposed in a solvent;
   G. coating a layer of said second liquid solution upon either said second laminate surface or said layer of fully cured thermoplastic polyimide;
   H. partially curing said second liquid solution to a layer of partially cured thermoplastic polyimide adhesive comprising in combination:
      a mixture of polyamic acid polymer and thermoplastic polyimide polymer solids disposed in said solvent, said mixture containing no less than 10% and no greater than 50% thermoplastic polyimide of the total polymer mass and said mixture further containing an amount of solvent of between 20 and 60% of the total mass of the mixture;
   I. positioning said first and second laminate surfaces together to form an unbonded laminate wherein said partially cured layer of thermoplastic polyimide is disposed between second laminate surface and said fully cured layer of thermoplastic polyimide; and
   J. applying heat and pressure to said unbonded laminate to:
      i. outgas said solvent from said adhesive bondline;
      ii. substantially convert all of said polyamic-acid polymer to said thermoplastic polyimide polymer, said conversion generating a quantity of water vapor;

iii. outgas said water vapor from said adhesive bondline; and
iv. bond said surfaces at the completion of said outgassing.

2. The method of claim 1 wherein the coefficient of thermal expansion of
one of said laminate surfaces is greater than the other.

3. The method of claim 1 further including the further step of applying additional higher pressure to said laminate to enhance said bond.

4. The method of claim 1 wherein said solvent is selected from the group consisting of N-methyl-2-pyrrolidone (NMP) and dimethylacetamide (DMAC).

5. The method of claim 1 wherein said polyamic acid polymer comprises a mixture of diamine and dianhydride monomers, said diamine monomer is selected from the group consisting of:
3,5-diaminobenzoic acid (DABA), 3,3'-diaminobenzophenone (3,3'-DABP),3,4'-diaminobenzophenone (3,4'-DABP), 1,3-Bis (4-aminophenoxy) benzene (TPER), 3,4'-Oxydianiline (3,4'-ODA), 4,4'-Oxydianiline (4,4'-ODA), 4,4'-Methylene dianiline (4,4'-MDA), an aliphatic diamine, and a silicon-diamine; and said dianhydride monomer is selected from the group consisting of 3,3',4,4'-Biphenyltetracarboxylic dianhydride (BPDA), 3,3',4,4'-Benzophenone tetracarboxylic dianhydride (BTDA), 4,4'-Oxydiphthalic anhydride (ODPA), Pyromellitic dianhydride (PMDA), and 2,2'-Bis-(3,4-Dicarboxyphenyl) hexafluoropropane dianhydride (6FDA).

6. A method for preparing a laminate by bonding two surfaces utilizing a heat activated thermoplastic adhesive coated bondfilm, said method comprising in combination:
A. providing a substrate having first and second substrate surfaces;
B. providing a first liquid solution comprising a less than fully cured thermoplastic polyimide adhesive precursor polyamic acid polymer disposed in a solvent;
C. coating a layer of said first liquid solution upon said first substrate surface;
D. fully curing said first liquid solution to form a layer of thermoplastic polyimide adhesive on said first substrate surface;
E. providing a second liquid solution a less than fully cured thermoplastic polyimide adhesive precursor polyamic acid polymer disposed in a solvent;
F. coating a layer of said second solution upon said second substrate surface;
G. partially curing said second liquid solution to form a layer of thermoplastic polyimide adhesive on said second substrate surface comprising in combination:
a mixture of polyamic acid polymer and thermoplastic polyimide polymer solids disposed in said solvent, said mixture containing no less than 10% and no greater than 50% thermoplastic polyimide of the total polymer mass and said mixture further containing an amount of solvent of between 20 and 60% of the total mass of the mixture; said coated substrate comprising said bondfilm;
H. providing a first laminate surface to be bonded;
I. providing a second laminate surface to be bonded;
J. disposing said coated substrate comprising said bondfilm between said first and second laminate surfaces to form an unbounded laminate; and
K. applying heat and pressure to said unbonded laminate to:
i. outgas said solvent from said adhesive bondline;
ii. substantially convert all of said polyamic-acid polymer to said thermoplastic polyimide polymer, said conversion generating a quantity of water vapor;
iii. outgas said water vapor from said adhesive bondline; and
iv. bond said surfaces at the completion of said outgassing.

7. The method of claim 6 wherein the coefficient of thermal expansion of
one of said laminate surfaces is greater than the other.

8. The method of claim 6 further including the further step of applying additional higher pressure to said laminate to enhance said bond.

9. The method of claim 6 wherein said solvent is selected from the group consisting of N-methyl-2-pyrrolidone (NMP) and dimethylacetamide (DMAC).

10. The method of claim 6 wherein said polyamic acid polymer comprises a mixture of diamine and dianhydride monomers, said diamine monomer is selected from the group consisting of:
3,5-diaminobenzoic acid (DABA), 3,3'-diaminobenzophenone (3,3'-DABP), 3,4'-diaminobenzophenone (3,4'-DABP), 1,3-Bis(4-aminophenoxy)benzene (TPER), 3,4'-Oxydianiline (3,4'-ODA), 4,4'-Oxydianiline (4,4'-ODA), 4,4'-Methylene dianiline (4,4-MDA), an aliphatic diamine, and a silicon-diamine; and said dianhydride monomer is selected from the group consisting of 3,3',4,4'-Biphenyltetracarboxylic dianhydride (BPDA), 3,3',4,4'-Benzophenone tetracarboxylic dianhydride (BTDA), 4,4'-Oxydiphthalic anhydride (ODPA), Pyromellitic dianhydride (PMDA), and 2,2'-Bis-(3,4-Dicarboxyphenyl) hexafluoropropane dianhydride (6FDA).

* * * * *